MULTILEVEL QUANTIZING FOR CHARACTER READERS

Filed Feb. 2, 1961

3 Sheets-Sheet 1

INVENTORS
JACOB RABINOW
ARTHUR W. HOLT
BY Joseph A. Genovese
Max L. Libman
ATTORNEYS

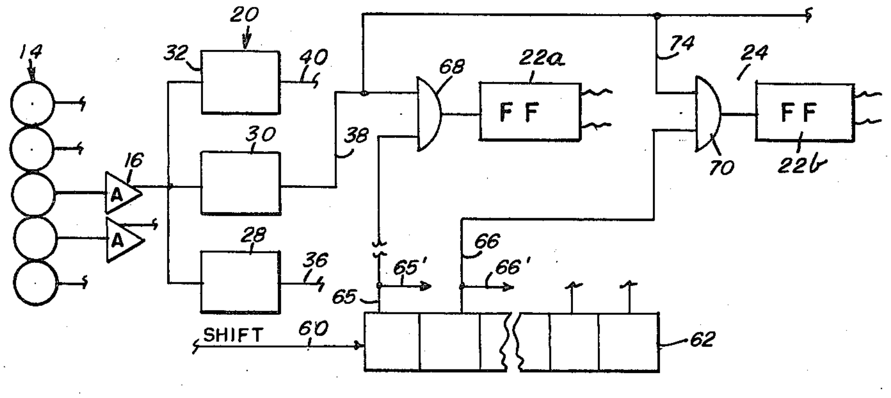
FIG. 2
LIGHT ABSORBTION TABLE
| | |
|---|---|
| VERY BLACK | 75-100% |
| BLACK | 50- 75% |
| DARK GRAY | 25- 50% |
| LIGHT GRAY | 5- 25% |
| WHITE | 0- 5% |
FIG. 3
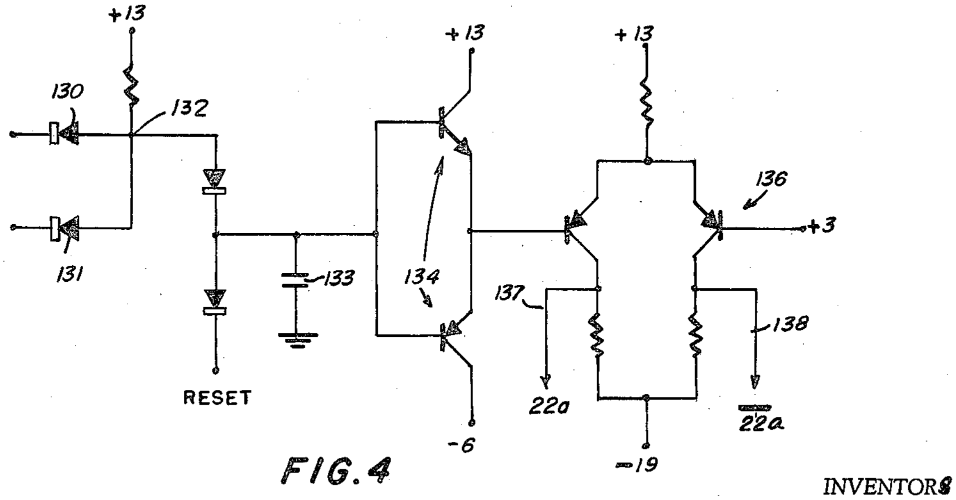
FIG. 4
INVENTORS
JACOB RABINOW
ARTHUR W. HOLT
BY Joseph A. Genovese
Max L. Libman
ATTORNEY INVENTORS
JACOB RABINOW
ARTHUR W. HOLT
BY Joseph A. Genovese
Max L. Libman
ATTORNEYS United States Patent Office 3,104,372
Patented Sept. 17, 1963

3,104,372

MULTILEVEL QUANTIZING FOR CHARACTER READERS

Jacob Rabinow, Takoma Park, and Arthur W. Holt, Silver Spring, Md., assignors to Rabinow Engineering Co., Inc., Takoma Park, Md.

Filed Feb. 2, 1961, Ser. No. 86,817
12 Claims. (Cl. 340—146.3)

This invention relates to character reading machines and particularly to methods and means for enabling them to function more efficiently with imperfect characters and/or characters accompanied by appreciable background noise.

This application is a continuation-in-part of copending application Serial No. 32,911 which was filed on May 31, 1960, and having a common assignee.

The term "character" used herein signifies letters, numerals, symbols, marks and other forms of intelligence. For brevity, the term "character" is used throughout the description and claims. Further, the principle of the invention is described in terms of optical reading machines having scanners which provide outputs that vary in accordance with the absorption of light falling on the character. However, it is not essential that the scanner outputs result from optical investigation. For instance, the invention is equally well suited for recognition equipment providing output signals from magnetic intelligence or others.

Considering a few of the problems encountered by reading machines, a given character may have some parts approaching total black and other parts of the same character may be dark gray and/or light gray. This is especially true if the characters are formed by a typewriter. Another difficulty is that the characters of a single typed line are often different shades of gray and black. Sometimes characters are wholly or partially smudged. This often happens when making carbon copies.

The human intellect automatically distinguishes smudges, i.e. background noise, from the significant portions of the character. Normally, when typewritten material is read, a human being does not consciously notice the different shades of gray and black of the characters.

Since machines are incapable of mental processes such as discussed above, character recognition machines pick up the different levels of reflected light and background noise, complicating the character recognition procedure of the machine. An object of this invention is to provide means and methods for overcoming the above difficulties in a machine such as disclosed in the copending application or in other character recognition machines.

A more specific object of the invention is to provide a system of quantizing the scanner outputs at a number of different thresholds to represent not only "black" and "white" but also to represent intermediate shades of "gray." We then select the quantized output which possesses the most significant information regarding the unknown character in order to make available a character identification signal which may be processed by any type of recognition circuit or circuits or systems.

Another object of the invention is to provide a plural-threshold or multilevel quantizing system which obtains the desired results by considerably fewer circuit components than would ordinarily be expected. In one embodiment, we code the scanner outputs to indicate the optical density of the elemental areas, and store the code in the temporary storage of the reading machine. Then we convert the code to analog signals proportional to the density of the area elements, making character identification input signals available for the decision section of the reading machine. By coding the signals, we are able to use a smaller capacity memory than would be the case of separate memories for each quantize level.

The general concept of quantizing is not new. Most reading machines quantize the scanner output signals at a single threshold to (*a*) provide a quantized signal representing "black" if the scanner signal is at or above the threshold, or (*b*) provide a different quantized signal (or no signal) representing "white" if the same scanner signal is below the threshold. In contrast, our invention takes intermediate shades of "gray" into consideration by quantizing the scanner output signals at more than one threshold. Thus, for a single scanner signal, we have at least three quantized signals to correspond to at least three levels of optical density of the scanned point from which the scanner output originated.

We are aware of another prior quantizing system which requires that a character, or line of characters, etc., be scanned a second time at a different sensitivity, if the first scanning attempt failed to provide a satisfactory output. Such a solution to the problem is not nearly so satisfactory as the solution presented herein for the following reasons:

The electronic circuits (and optics) of character recognition machines are very much faster than the scanning in mahines in which the scanning speed is a function of the "paper moving" equipment. In other words, the speed of modern character recognition machines is limited by the capabilities of the mechanisms and techniques of presenting the character or characters to the scanner (or vice versa), and not the electronic data processing of the information available at the scanner. By requiring a separate scan operation or even a repetition of a previous scan and/or paper handling step to obtain quantizing, the slowest part of the machine must be reused.

One of the features of our invention is that the various embodiments are capable of quantizing at any number of levels in parallel, completely independent of the act of scanning, i.e. the relative movement of the scanner and paper handling, so that the speed of the character recognition machine is not significantly reduced. Even though we may quantize serially to any number of levels, the faster system comprehended by the invention is to quantize to various levels in parallel so that the quantizing itself is fast.

Other objects and features of importance will become apparent in describing the illustrated forms of the invention which are given by way of example only.

FIGURE 2 is a fragmentary diagrammatic view showing in additional detail, one possible construction of portions of the system shown in FIGURE 1.

FIGURE 3 is a light absorption table showing arbitrarily selected quantizing ranges for different optical gradations of black, gray and white.

FIGURE 4 is a circuit diagram showing storage means by an analog procedure.

Figures 5, 5A, 6:
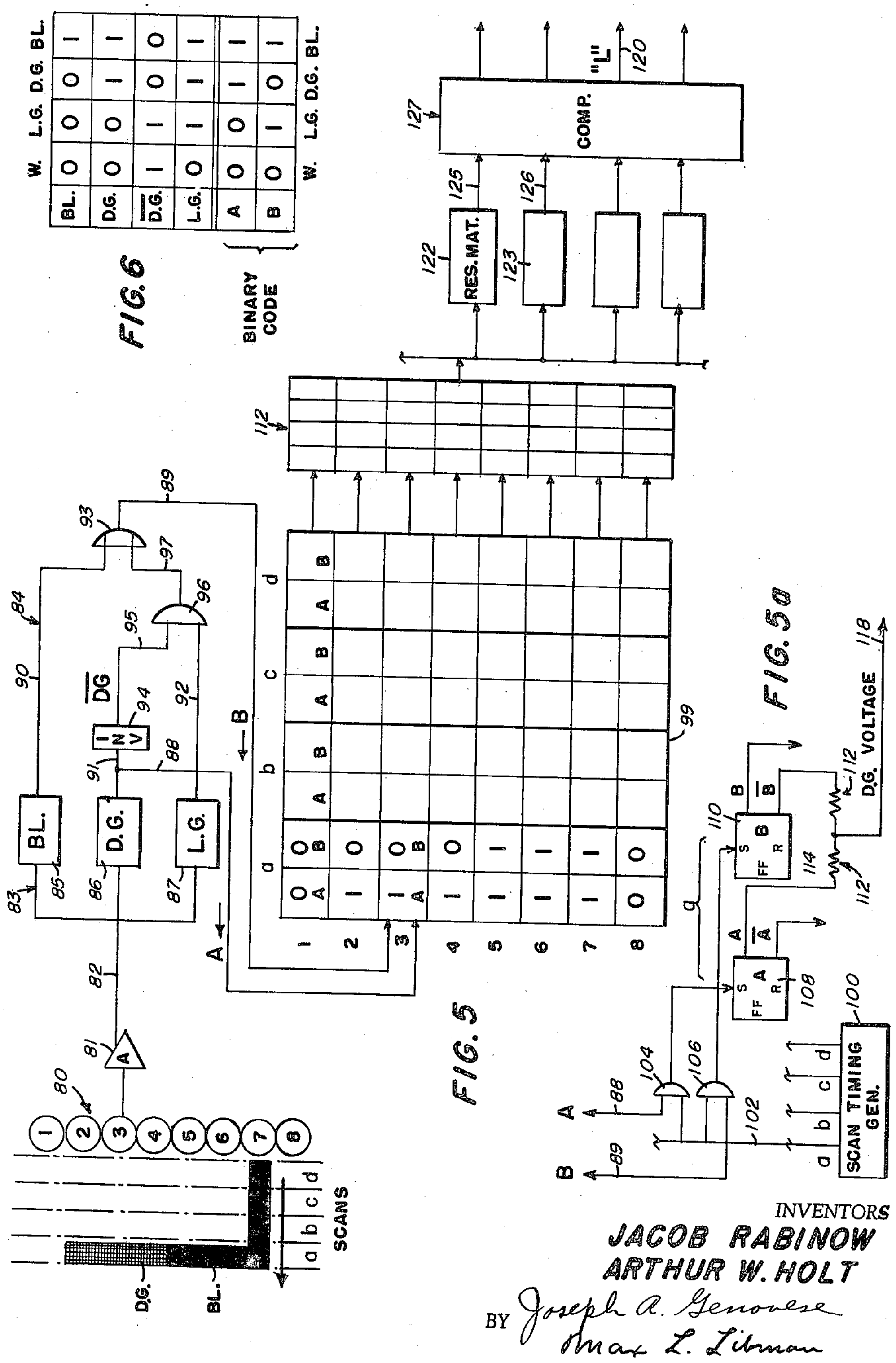
FIGURE 5 is a schematic view showing a form of our invention using a binary coding system to represent the various quantized signals.

FIGURE 5*a* is a fragmentary view showing one point in the shift register memory and the part of the summing network for deriving one quantized signal.

FIGURE 6 is a truth table for one possible binary coding system which may be used in the embodiment of FIGURE 5.

Figure 1:
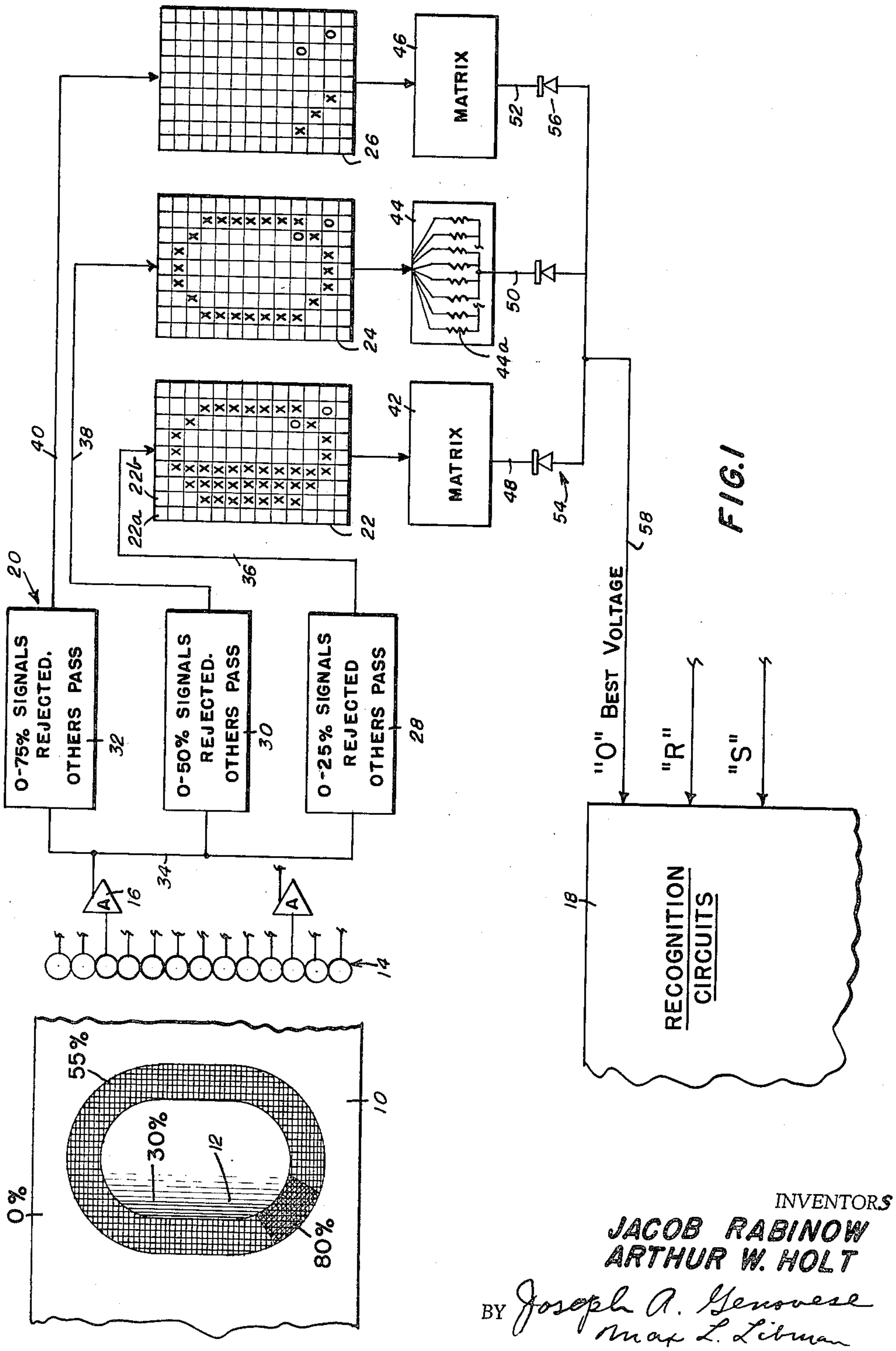
FIGURE 1 is a diagrammatic view showing one system for the practice of the invention.

In the accompanying drawings FIGURE 1 shows the character "O" on a white background 10. Although the character is nominally called "black," in practice, characters are usually very dark gray and vary to light gray in some regions. Further, although the background 10 is called "white," absolute white does not exist since there is some small light absorption even when a sheet appears to be very white to the eye. A smudge 12 is shown within the "O," and this is considered background noise to a character recognition machine. The line forming the character is shown as possessing areas of different light absorption properties, i.e. 55% and 80% respectively.

Many reading machines function by investigating elemental areas of the character and deciding whether each area is "black" or "white." The intermediate shades, i.e. the "grays," are ambiguous to the machine. The ambiguities can be resolved accurately in several ways, one of which is shown in FIGURE 4, reproduced from the pending application and discussed therein as follows:

"The reading machine can be made more powerful by the use of the 'gray-scale' or 'analog' storage. If this is done, then mistakes due to calling a point black when it should have been white or vice versa will never happen. Actually, the grayness of an optical point is information which should not be thrown away, at least in a machine of ultimate recognition power.

"There are at least two distinct ways of accomplishing the storage of the gray scale. One is to simply quantize into more states than just black and white; three states could be chosen, such as black, gray and white; or four, or ten. Let us suppose that we are going to store eight different states on the gray scale. This can be done digitally by having eight flip-flops for each storage point (only one of which represents the stored valve) or it can be done by having three flip-flops and using their combinations. This technique is described later in connection with FIGURES 1 and 2. Another technique is to use analog rather than digital storage to store a gray scale.

"There are many other types of components which can be used for analog storage instead of the quantizer condenser arrangement shown in FIGURE 4, including magnetic devices, or adaptations of various other types of analog storage devices. However, it is within the broad scope of the invention to utilize such arrangements for taking into account the 'grayness' factor of the character being read.

"FIGURE 4 shows some storage circuits of a character recognition machine using capacitor type analog storage. Referring to the circuit of FIGURE 4, the lefthand two diodes 130 and 131 form an AND gate. One of these diodes is connected to the output of a photocell amplifier 16 (FIGURE 1), and the other is connected to the load-column timing pulse generator 62 (line 65 in FIGURE 2). The load-column pulse on line 65 is a pulse which has a completely binary amplitude, i.e., it goes from 0 volts to +6 volts during the time that it is desired to load a column of the storage registers, e.g., register 22 in FIGURE 1. The output of the photocell amplifier, however, is a voltage which varies between 0 volts and +6 volts according to how gray the spot is which was seen. For instance, let 0 volts represent white, +3 volts indicate an intermediate gray, and +6 volts represent completely black. When the load-column pulse goes up to +6, then the voltage at point 132 will rise to whatever potential is present on the output of the photocell amplifier. Let us say this is +4 volts. This +4 volts is transferred to the capacitor 133 (which has been previously reset to 0 volts). The capacitor is followed by a double emitter follower 134 to provide isolation so that the charge on the capacitor will not leak off too fast. The double emitter follower drives one side of a differential amplifier 136. The differential amplifier will produce voltages on its two collectors which are complements of each other. The circuits are so designed so that for a +4 stored on the capacitor the lefthand collector line, 137, of the differential amplifier will give −4 volts and the righthand collector line, 138, will give −2 volts. These complementary outputs will be used in the resistor matrices to help make the character decision, thereby introducing the 'grayness' of the scanned character as a factor in the decision made by the best voltage selector."

Consider now the digital forms of the invention shown in FIGURES 1 and 2. Scanner 14 is made of a row of photocells to inspect the moving image of the "O," and these have amplifiers 16 for the photocell outputs. The recognition circuits 18, or the equivalent, may follow the philosophy of the J. Rabinow Patent No. 2,933,246, or else those disclosed in the copending application, or any others forming a part of many different kinds of reading machines disclosed in the prior art. One multilevel quantizing assembly 20 is shown connected with one amplifier 16, but it will be understood that each amplifier 16 will have an individual assembly 20, and each will provide outputs for a separate group of three memory devices, e.g., flip-flop matrices 22, 24 and 26 associated with it.

Multilevel quantizing assembly 20 consists of three quantizers or voltage comparators 28, 30 and 32 fed in parallel over lines 34 from amplifier 16. The memory matrices are loaded with information over lines 36, 38 and 40 which are respectively connected with comparators 28, 30 and 32 and matrices 22, 24 and 26. Lines 36, 38 and 40 represent separate conductors as will be more fully developed with the description of FIGURE 2. We have arbitrarily decided, by way of example, to quantize at 25% light absorption (light gray), 50% (dark gray) and 75% (black). These ranges and the thresholds separating them could be changed. Furthermore, additional or fewer comparators and matrices may be selected depending on how many quantizing levels are desired.

The voltage comparators are, in themselves conventional. By setting or constructing them to reject signals (amplified outputs of the photocells) below preselected voltage references, e.g. voltages proportional to 25%, 50% and 75% light absorption, we mean that the comparators will pass signals in a voltage range above the selected limits. For voltage comparator 28, signals from amplifier 16 having a voltage proportional to about 0–25% light absorption are rejected, while all other signals are passed to matrix 22 over line 36. Comparator 30 passes only signals above 50%, and comparator 32 passes signals above 75%. Correlating the character O with the information appearing in the matrices, this feature is more clearly understood. Matrix 22 contains information responding to 25–100% absorption of the scanned character O. The matrix 24 contains information corresponding to the 50–100% light absorption portions of the character O. Matrix 26 contains the information above the 75% reference.

When the information is loaded in the matrices 22, 24 and 26, it is applied to correlation resistor adder matrices 42, 44 and 46 in the manner described in application Serial No. 32,911. The three resistor matrices provide output voltages proportional to the quantity of significant information of flip-flop matrices 22, 24 and 26. Matrix 24 contains a perfect O, in the example, while the others do not. Assuming that the "best" voltage on lines 48, 50 or 52 is the lowest voltage, an analog OR gate 54 may be used to combine the voltages from similar matrices 42, 44 and 46 and provide an output signal corresponding to the best value for the character "O." OR gate 54 may be constructed in a number of ways, probably the simplest being diodes connected in parallel to provide an output on the best voltage line 58. This best voltage (the most negative voltage) is now available to be fed to the recognition circuits 18.

FIGURE 2 is a reproduction of a portion of the disclosure in the copending application simply to show in this application a portion of one possible memory device such as matrix 22, and to provide the basis of a brief description of the operation of a reading machine as it is affected by this invention.

Flip-flops 22*a* and 22*b* are the top flip-flops in a horizontal row of matrix 22. The remainder of the horizontal row and all of the rows parallel thereto are omitted.

As the character "O" moves horizontally, shift pulses are applied on line 60 to shift register 62 so that output pulses appear on lines 65, 66, etc., in timed sequence with the horizontal movement with the character. The same lines 65', 66', etc., concurrently provide output pulses for getting information into the matrices 24 and 26 as described below in connection with matrix 22. Lines 65, 66, etc., form one input of AND gates 68, 70, etc., and the outputs of the AND gates are applied to flip-flops **22*a*, 22*b***, etc.

The other inputs to gates 68 and 70 are from quantizing assembly 20 on line 38. Accordingly, when the voltage comparator 30 sees information at the time that a scan timing pulse appears on one of the gates 68, 70, etc., the gate is satisfied thereby setting the flip-flop, for instance flip-flop **22*a*. If comparator 30 did not provide an information output at the time of a pulse on line 65, the flip-flop 22*a*** would not be set.

As disclosed in the copending application the flip-flops **22*a*, 22*b*, etc., have two outputs termed "assertion and negation," and the assertion and negation wires are fed to the resistor matrices 42, 44 and 46** just as corresponding wires are connected with correlation matrices in the copending application. To assure distinction between characters, e.g., O and Q, the negations of two flip-flops are shown as circles in FIGURE 1. As disclosed in the copending application we can use weighted positions by selection of the values of the resistors in the resistor matrices.

In recapitulation, the multilevel quantizing is accomplished by quantizing an amplified output of the scanner to any number of output levels. The quantized output is then examined for the most favorable level, and a signal associated therewith is made available for application to the appropriate circuits of a reading machine.

The embodiment of FIGURES 5–6 achieves multilevel quantizing in a different way, relying on a binary code which facilitates data processing. Briefly, we use level detectors, comparators or an equivalent means to establish a code for the scan outputs. The table of FIGURE 6 explains a typical binary code for four levels from white through black. The code information is stored in a temporary memory, prior to being applied to a summing network. The network converts the digital data to analog values, e.g. voltages, proportional to the optical densities represented by the code. From this point, the machine is the same in principle as FIGURE 1 and copending application Serial No. 32,911.

FIGURE 5 shows a character "L" partly dark gray and partly black. Scanner 80 is timed to scan the horizontally moving character and its background in four fields scan a, b, c and d, respectively. The scanner outputs from the illustrated photocells are amplified at 81. The amplified outputs are conducted on lines 82 to quantize or detector sections 83 having a logic circuit 84 associated therewith. We have shown only one amplifier 81, line 82 and section 83, but it is understood that each photocell will have a similar arrangement.

Section 83 has detectors or comparators 85, 86 and 87 for black, dark gray and light gray respectively. The code (FIGURE 6) is generated on lines 88 and 89, also identified as A and B respectively for convenience. The logic circuit operation is as follows: When a photocell sees "black," all of the detectors 85, 86 and 87 will provide outputs on their respective lines 90, 91 and 92. The signal on line 90 is OR gated at 93, and the gate output is line 89, e.g. one of the two code establishing lines (B). The "dark gray" line 91 is connected to line 88 (code line A), so that we have the code 11 (binary one, one) for black.

The code for dark gray is listed (FIGURE 6) as 10 (one, zero). When a photocell sees dark gray, black detector 85 provides no output, while the dark gray and light gray detector lines 91 and 92 conduct signals. Code line A conducts a signal because it is attached to line 91.

The signal on this line is inverted at 94, so that the inverter output ("not" dark gray) will be non-conducting (or conducting a negative voltage signal) on line 95 to And gate 96. Although the other input of gate 96 is the light gray detector output line 92, gate 96 will not be satisfied. Hence there is no signal on gate output line 97 which connects to Or gate 93, and code line B will register a binary, zero. Thus, the code 10 (binary one, zero) is established for dark gray. The codes for light gray and white are now readily apparent by tracing signals through logic circuit 84 in a similar way.

Instead of three shift register, flip-flop memories as in FIGURE 1, this form of our invention requires only one memory 99. It has a component (flip-flops) count of two-thirds of that of the three memories 22, 24 and 26. Each column (*a*, *b*, *c* and *d*) of the memory has two vertical rows of flip-flops instead of one as in the copending application. The flip-flops are in pairs with one termed the A and the other the B flip-flop. The pair for column A, photocell 3 is reproduced in FIGURE 5*a*. All other pairs will be the same.

FIGURE 5*a* shows scan timing generator 100 identical to generator 62 (FIGURE 2), and a timing pulse line 102 for column "*a*" of the memory. Code information on lines 88 and 89, i.e., A and B, is gated at And gates 104 and 106 with scan timing line 102 to gate the code ("dark gray" in the example) into the A and B flip-flops 108 and 110. The flip-flops each have two available outputs just like flip-flops **22*a* and 22*b*** (FIGURE 2), only two of which are used for the "dark gray" output.

The timing generator steps in time with the movement of the character in order to gate the coded information into the successive columns of memory 99. The outputs of the pairs of flip-flops of the memory are connected with a summing network 112, whose function is to make available analog signals proportional to the code at each point (pair of flip-flops) in the memory. A fragment of network 112 is shown in FIGURE 5*a* for dark gray at col. "*a*" row "3." Resistors or the equivalent, 114 and 116 are connected to the assertion terminal of flip-flop 108 and the negation terminal of flip-flop 110. This makes available a signal on center tapped line 118, whose value is uniquely proportional to "dark gray." For other gradations of the gray scale and black, other combinations of flip-flop outputs and/or resistor values are selected. The importance is that our invention yields useful information for every point of the character, and does not require some to be rejected as would be the case if we quantized to two levels, i.e. white and black. Network 112 provides analog outputs proportional to the optical density of the elemental areas of the character so that some credence is given to all elemental areas. Our invention makes it simple to use "negations" and "weighted positions" by mere section of resistor values, in addition to the multi-level quantizing. These terms are fully explained in the J. Rabinow et al. copending application.

From network 112 to final character identification on wire 120, the arrangement may be the same as in the copending application. Upon interrogation, the information in the memory 99 available at network 112, is conducted to correlation resistor matrices 122, 123, etc. The outputs of the correlation matrices are conducted on lines 125, 126, etc., to the best match voltage selector 127 having output wires for the various characters, e.g., line 120 for the "L." Such a system relies on the "best match" technique explained in the copending application, but it is to be clearly understood that multiple level quantizing forming the subject matter of our presently claimed invention, may be used in reading machines which rely on other techniques in the decision sections thereof.

Various modifications and changes regarding the invention may be resorted to without departing from the scope of the claims.

We claim:

1. In a character reading machine for an unknown character on an area, scan means for investigating the elements of the area and for providing outputs which correspond to the optical density of said elements, means for quantizing said outputs at more than one threshold and for providing signals corresponding to the optical density of said elements with respect to said thresholds, means responsive to said signals for providing an output code corresponding to said signals, a memory; means to store said code in said memory, and means to convert the stored code to signals which are adapted to be conducted to utilization means in the reading machine.

2. In a character reading machine for an unknown character on an area, scan means for investigating the area element-by-element and providing outputs corresponding to the optical density of the character, the improvement comprising means to quantize said outputs at more than one threshold established by preselected optical density limits for the acceptance of said outputs, said quantize means providing signals corresponding to the optical density of the elements of an unknown character with respect to said thresholds, and selection means for providing an output signal corresponding to the quantized signal having the most significant information concerning the configuration of the unknown character.

3. The character reading machine of claim 2 wherein said selection means include means to sum sets of quantized signals, and means to select a predetermined set from which the output signal of said selection means is derived.

4. In a reading machine for recognizing a character on a background area where the detail information varies, and wherein the reading machine has a scanner providing outputs which vary in accordance with the information content of the elemental areas of the character and its background, the improvement comprising means to quantize said outputs at more than one threshold and provide quantized signals having character information developed with respect to said thresholds, means to develop a code in response to said signals, a memory, means to store said code in said memory, means responsive to the stored code for converting the code to analog signals proportional to said quantized signals, and means connected with said converting means to conduct said analog signals to utilization circuits of the reading machine.

5. The subject matter of claim 4 wherein said utilization circuits have correlation means, and means responsive to the outputs of said correlation means to produce a character identification signal for the character.

6. In a reading machine having a scanner and recognition means, the improvement comprising means fed by the outputs of the scanner for quantizing the outputs at more than one threshold and providing quantized outputs; storage means, means to store said quantized outputs in said storage means; and means for providing a signal for the recognition means from the storage means.

7. The machine of claim 6 wherein said quantizing means are comparators, and said storage means are matrices of digital devices.

8. The machine of claim 7 wherein said signal providing means include resistor matrices, and a gate operatively connected with said resistor matrices.

9. In a character reading machine for characters on areas; scan means for providing a set of outputs corresponding to the information content of a character on an area, obtained by investigating the elements of said area; means to quantize said set of outputs at a plurality of thresholds and provide a plurality of sets of quantized outputs corresponding to said information content; means responsive to said quantized outputs for providing a signal corresponding to one of said sets of quantized outputs; and means for conducting said signal to utilization circuits of the reading machine.

10. The subject matter of claim 9 wherein said scan means are optically responsive; and said quantize means include comparators which discriminate the scanner outputs on the basis of signal values proportional to optical densities of the character.

11. In a reading machine having a scanner providing signals corresponding to the optical density of the elemental areas of an unknown character, and a decision section; detecting means responsive to said signals to quantize said signals at a plurality of thresholds and to provide outputs corresponding to said signals, logic circuit means connected with said detecting means and responsive to said outputs for generating a code identifying the optical density of the elemental areas examined by the scanner, a memory composed of digital devices, means to gate said code into said memory, said digital devices having outputs corresponding to said code, a summing network operatively connected with the outputs of said digital devices to provide analog signals proportional to the corresponding scanner outputs, and means to conduct said analog signals to the decision section of the reading machine.

12. In a reading machine for characters which vary in optical density, optical scan means for examining elemental areas of each character and providing outputs proportional to the optical density of each scanned elemental area, quantizing means responsive to said outputs to quantize said outputs at more than one threshold and provide corresponding signals, coding means to develop a binary code which identifies each signal in accordance with the optical density that it represents, a memory having pairs of digital devices, means to store said code in the memory by activating said pair of digital devices, a summing network having means connected to said digital devices to derive analog signals corresponding to the particular coded states of said pairs of digital devices, said analog signals corresponding to said scan outputs thereby also corresponding to the optical densities of the elemental areas of the character, whereby at least some weight is given to all elemental areas of the character which are of a density value sufficient to operate said coding means, and means connected with said network for conducting the output of said network to a utilization means in the reading machine.

References Cited in the file of this patent

UNITED STATES PATENTS 2,897,481 Shepard ---------------- July 28, 1959